United States Patent [19]

Lessat-Kaupat et al.

[11] Patent Number: 5,383,818
[45] Date of Patent: Jan. 24, 1995

[54] OVERLOAD CLUTCH FOR LIMITING A TORQUE MOMENT

[75] Inventors: Wolfgang Lessat-Kaupat; Guenther Kallies, both of Hamburg, Germany

[73] Assignee: Deutsche Aerospace Airbus GmbH, Hamburg, Germany

[21] Appl. No.: 905,248

[22] Filed: Jun. 26, 1992

[30] Foreign Application Priority Data

Jul. 2, 1991 [DE] Germany ............... 4121892

[51] Int. Cl.$^6$ ............... F16D 7/08; F16D 3/10
[52] U.S. Cl. ............... 464/36; 192/56 R; 464/39; 464/160
[58] Field of Search ............... 192/56 R, 108; 464/35–39, 160

[56] References Cited

U.S. PATENT DOCUMENTS

| | | | |
|---|---|---|---|
| 2,490,172 | 12/1949 | Swahnberg | 464/36 X |
| 3,185,275 | 5/1965 | Orwin | 464/36 X |
| 3,252,303 | 5/1966 | Weasler et al. | 464/36 |
| 3,942,337 | 3/1976 | Leonard et al. | 464/36 |
| 4,226,316 | 10/1980 | Geisthoff | 464/36 |
| 4,294,340 | 10/1981 | Kunze | 192/56 R |
| 5,005,684 | 4/1991 | Fujii | 464/36 |
| 5,054,588 | 10/1991 | Thorp et al. | 192/56 R X |

FOREIGN PATENT DOCUMENTS

| | | | |
|---|---|---|---|
| 3120303 | 10/1982 | Germany. | |
| 221800 | 5/1985 | Germany. | |
| 721598 | 3/1980 | U.S.S.R. | 464/36 |

Primary Examiner—Daniel P. Stodola
Assistant Examiner—Eileen A. Dunn
Attorney, Agent, or Firm—W. G. Fasse; W. F. Fasse

[57] ABSTRACT

An overload clutch limits the transmittable torque moment by permitting an override when a certain compression force is exceeded. For this purpose a drive shaft meshes with a disk provided with a number of holes in which balls are received. The disk has an axial thickness smaller than the diameter of the balls so that the balls can be uniformly exposed to a compression force exerted by a compression spring through a disk or bushing bearing on the balls. The balls cooperate with an entraining cam disk. As long as the torque to be transmitted is smaller than the compression force, the balls engage cam ribs on the entraining disk and transmit the torque. When the input torque exceeds the compression force, the balls override the cam ribs.

5 Claims, 2 Drawing Sheets

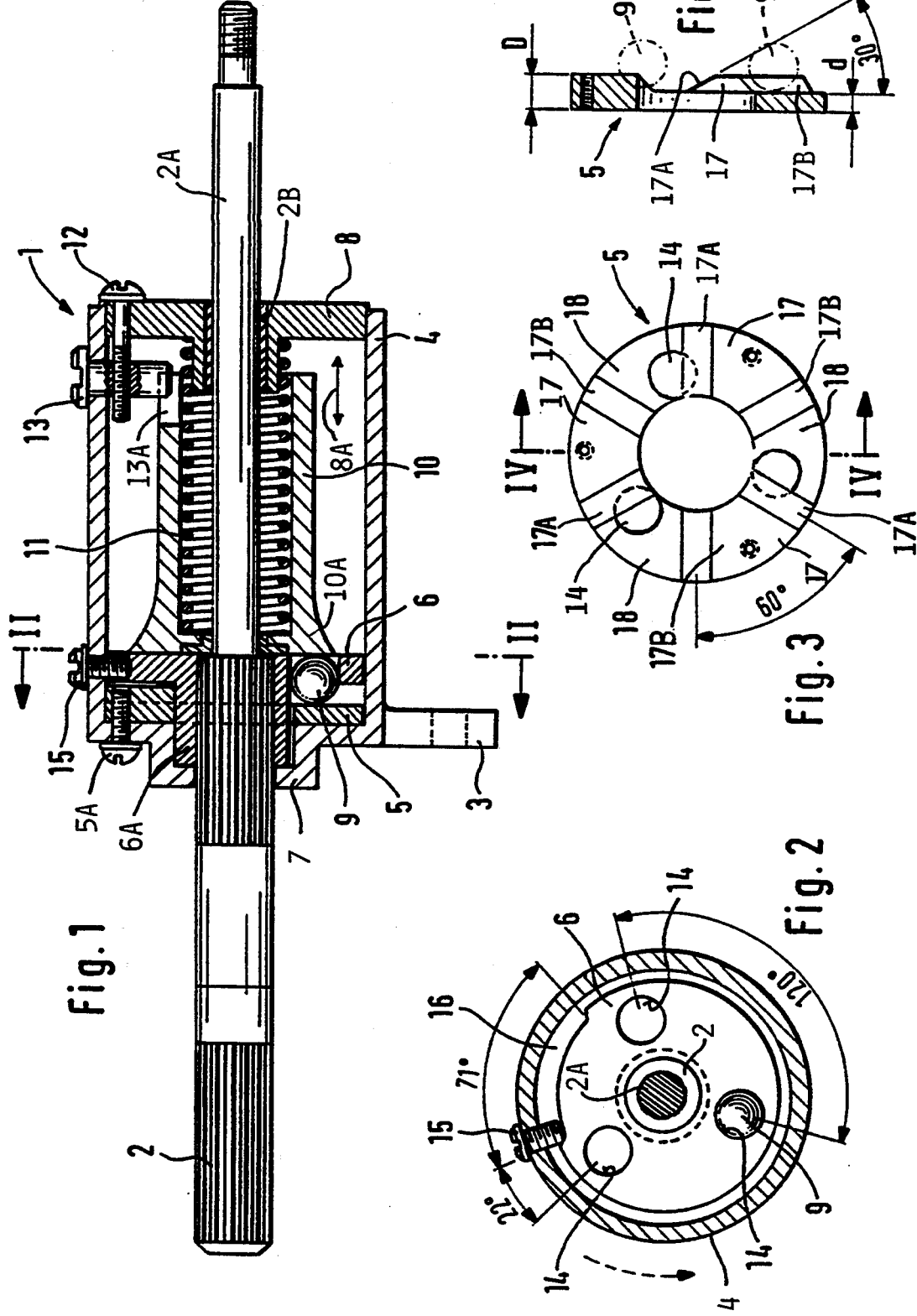

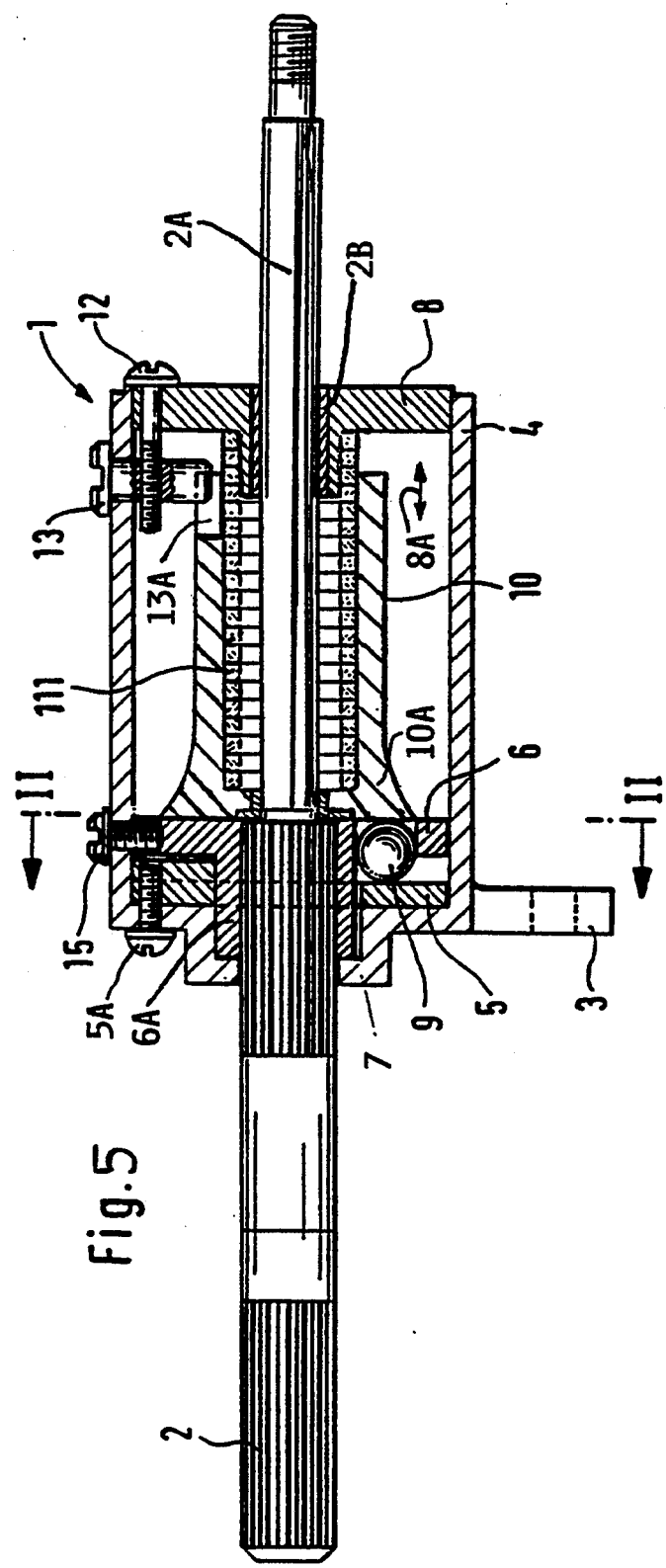

5,383,818

OVERLOAD CLUTCH FOR LIMITING A TORQUE MOMENT

FIELD OF THE INVENTION

The invention relates to an overload clutch for limiting a torque moment to be introduced into a structural component, such as a drive shaft.

BACKGROUND INFORMATION

Overload clutches are used to protect structural components against an overload, thereby avoiding an interruption of an operational sequence. Without such protection an interruption can occur when a structural component in a train of movement or power transmission train suddenly fails due to an overload, whereby a jamming of the operation or motion could be caused.

There are many areas in which such a jamming is very undesirable. For example, an aircraft door must be operable with certainty. For opening an aircraft door, the locking mechanism of the air-craft door is constructed for first lifting the door out of a locked position and to then tilt the door outwardly. In an emergency the lifting mechanism of the door operates a lever in the door frame by means of a bolt forming part of the door. This lever is connected to the end of a shaft by means of an overload clutch for deploying emergency slides or chutes. An opening motion of the air-craft door in an emergency is transmitted through the overload clutch and through a Bowden pull which applies a linear motion to the emergency slide release mechanism. As a result, in an emergency the opening of the door automatically deploys the emergency chute into an operational condition so that passengers may slide down the emergency chute. For a proper and safe operation of the emergency chute release mechanism, it is necessary that the opening motion of the door is transmitted through the overload clutch to the Bowden pull without any slippage. However, if in an emergency the Bowden pull should be blocked, this fact must not prevent the opening of the door. For this purpose, it is necessary that the overload clutch will yield upon reaching of a determined torque moment, so that the door can be properly opened in spite of the blocked Bowden pull.

A so-called ball safety clutch of conventional construction cannot be used in the above described situation, because such a clutch does not assure a slip-free power transmission up to a determined torque load. In a ball safety clutch, the drive is connected to the clutch housing, while a power take-off is provided with an entraining cam disk having several radial recesses Both, the drive and the entraining cam disk are rotatably mounted to the housing. The housing also supports a cage element comprising a plurality of axial bores corresponding to the number of recesses in the entraining cam disk. The cage element is positioned opposite to the recesses in the entraining cam disk. Each axial bore holds a ball biased by a compression spring for engaging one of the recesses in the entraining cam disk. An adjustable pressure plate is also provided on the housing in such a way that the balls are biased with a selectable spring force into the depressions of the entraining cam disk. In this type of structure, the occurrence of any torque moment at the ball safety clutch causes a rotation of the drive components relative to the power take-off components so that a slip-free transmission of the motion is not possible in the just described conventional slip clutch even before the above mentioned determined torque load is applied to the input of the clutch.

OBJECTS OF THE INVENTION

In view of the above, it is the aim of the invention to achieve the following objects singly or in combination:

to construct an overload clutch in such a way that a trailing angle between the power take-off and the power input is as small as possible to minimize slippage prior to reaching a limit torque value which the overload clutch must not transmit to make sure that any further power transmission beyond said limit torque value is prevented upon reaching the limit torque value; and to make sure that even if the emergency chute deployment mechanism should be blocked, the aircraft door can still be properly opened without difficulties.

SUMMARY OF THE INVENTION

The overload clutch according to the invention for limiting a torque moment is characterized by a cage element constructed as a disk with holes for receiving and holding clutch balls. The disk with holes is substantially smaller in its axial thickness than the diameter of the balls. A compression spring for providing the required spring force is arranged coaxially around a drive shaft. The spring force is centrally introduced to the balls through a pressure application element. Such a structure has the advantage that it is compact and has a relatively small structural weight. Additionally, the compression force is applied uniformly to all balls whereby trailing between input and output is minimized prior to reaching the above mentioned limit torque value.

BRIEF DESCRIPTION OF THE DRAWINGS

In order that the invention may be clearly understood, it will now be described, by way of example, with reference to the accompanying drawings, wherein:

FIG. 1 shows a longitudinal section through an overload clutch according to the invention;

FIG. 2 is a sectional view along section line II—II in FIG. 1;

FIG. 3 shows a plan view of a cam entraining disk forming part of the clutch structure;

FIG. 4 is a sectional view along section line IV—IV in FIG. 3; and

FIG. 5 shows a longitudinal section through an overload clutch according to an alternative embodiment.

DETAILED DESCRIPTION OF A PREFERRED EXAMPLE EMBODIMENT AND OF THE BEST MODE OF THE INVENTION

FIGS. 1 and 2 show in conjunction an overload clutch 1 with an input drive shaft 2 and a power output or take-off 3. Both the power input shaft 2 and the power take-off 3 are mounted in or to a common housing 4. The housing components are arranged with a rotational symmetry around the central longitudinal axis of the input shaft 2.

The left-hand end wall of the housing 4 is formed as a bearing box 7 in which the drive shaft 2 is mounted for rotation relative to the housing 4. The right-hand end 2A of the power input shaft is mounted in a slide bearing 2B in an end wall 8 that closes the right-hand end of the housing 4. Thus, the housing 4 can rotate relative to the shaft 2 or vice versa.

Power from the shaft 2 is transmitted to the housing 4 and thus to the output 3 through a cage element 6 in the form of a plate or disk with at least three holes 14 in the disk. The disk is secured to a bushing 6A which in turn meshes with the splines of the drive shaft 2. The disk 6 has, according to the invention, a thickness in the axial direction which is effectively smaller than the diameter of the balls 9 received in the holes 14.

The balls 9 cooperate with an entraining cam disk 5 that is rigidly secured to the housing 4 by screws 5A. The entraining cam disk 5 will be described in more details below with reference to FIGS. 3 and 4.

A pressure application element 10, for example in the form of a bushing, bears with its foot 10A against the balls 9 in the holes 14. A compression spring 11 is arranged coaxially to the input drive shaft 2, 2A, and preferably also inside the bushing 10. The foot 10A, due to its coaxial arrangement with the drive shaft 2, 2A applies the compression force exerted by the spring 11 uniformly and centrally to all balls 9. The compression spring 11 is properly guided inside the bushing 10, so that the compression spring 11 is laterally restrained. The left-hand end of the spring bears against an inner shoulder of the foot 10A of the bushing 10, while the right-hand end of the spring 11 bears against the closure wall 8 of the housing 4.

The bias force of the spring 11 is adjustable by screws 12 which adjust the position of the closure wall 8 axially in the housing 4 as indicated by the arrow 8A. Preferably three adjustment screws 12 are provided for this purpose. Three respective cross-bolts 13 extend radially into the housing 4 and are provided with a cross-threading extending axially for engagement by the adjustment screws 12. The cross-bolts 13 have such a radial length that they can reach into slots 13A in the right-hand end of the bushing 10. However, the radial length of the bolts 13 is such that the inner end of the bolts does not contact the compression spring 11. The inner ends of the bolts 13 reaching into the slots 13A prevent a rotation of the bushing 10 relative to the housing 4.

FIG. 2 shows the plan view of the disk 6 with its holes 14. Only one ball 9 is shown FIG. 2. A stop screw 15 also reaching radially into the housing 4 limits the rotation of the disk 6 relative to the housing 4 within the limits determined by the circumferential length of a recess 16 in the disk 6. As shown, the circumferential limits of the recess 16 permit, for example, a 71° rotational movement of the drive shaft 2 relative to the housing 4.

In this case three holes 14 are provided in the disk 6, they are spaced from one another uniformly by 120° in the circumferential direction. The left-hand end of the recess 16 is spaced, on-center, from the nearest axial hole or axial bore 14 in the disk 6 by 22°. The other end of the recess 16 would be spaced from the nearest hole by 27°.

FIGS. 3 and 4 show details of the entraining cam disk 5 comprising for example three radially extending cam ribs 17 having a thickness D and for example three sectors 18 which are thinner than the cam ribs 17 and have a thickness d to form respectively three depressions 18, preferably corresponding in number to the number of said axial holes or axial bores 14. The cam ribs 17 have circumferentially sloping walls 17A and 17B, whereby the slope is about 30° as shown in FIG. 4.

As long as the force exerted by the torque moment applied by the drive shaft 2 is smaller than the axial compression force of the spring 11, the balls 14 will stay within the depression sectors 18 formed between two neighboring cam ribs 17 and the drive force will be transmitted to the output member 3. When the respective predetermined torque moment is exceeded, the balls will yield against the force of the spring 11 and override the cam ribs 17.

Rather than driving the disk 6 with its balls 9, as shown and described, it is possible to modify the present invention by reversing the arrangement, thereby driving the cam entraining disk 5 and keeping the disk 6 stationary. In such an embodiment, the drive shaft 2 would be meshing with the disk 5 which would be limited to a rotational movement, for example, within the same range of up to 71° while the disk 6 would be kept stationary relative to the housing 4.

Another embodiment of the invention obviates the bushing 10 altogether. The foot 10A would then be formed as a washer type pressure application member and the compression spring 11 would have such an inner diameter that it is properly guided by the shaft extension 2A.

Rather than using a helical compression spring 11 as shown in FIG. 1 it is possible to use a so-called friction spring, for example, in the form of a disk spring or the like. In a preferred embodiment, the compression spring comprises a stack of annular springs formed as friction annular springs 111 shown in FIG. 5, whereby the transimittable torque moment is further limited by the friction between the annular springs 11A and 11B. The transmittable torque moment is limited to a position of the balls 9 in the recesses 18 formed between the cam ribs 17.

Although the invention has been described with reference to specific example embodiments, it will be appreciated that it is intended to cover all modifications and equivalents within the scope of the appended claims.

What we claim is:

1. An overload clutch for limiting a torque moment, comprising a housing (4) with a central longitudinal axis, a drive shaft (2) rotatably mounted in said housing, power take-off means (3) rigidly connected to said housing, an entraining cam disk (5) including several depressions (18) in said entraining cam disk (5), and a cage element (6) facing said depressions, said cage element comprising a plurality of axial bores (14), a ball (9) in each of said bores, and a stack of annular friction springs positioned for applying a compression force to said balls, means (12, 13) for adjusting said compression force, and wherein said cage element is a disk (6) with holes (14) forming said axial bores, said disk (6) having an axial thickness smaller than the diameter of said balls, a pressure application element between said balls and said stack of annular friction springs so that said compression force is centrally effective through said pressure application element on said balls, said clutch further comprising limit elements (15, 16) between said housing (4) and said disk (6) for limiting rotation of said disk (6) relative to said housing (4).

2. The overload clutch according to claim 1, further comprising means (6A) for applying a drive force by said drive shaft to said disk (6).

3. The overload clutch of claim 1, further comprising a compression bushing (10) in which said stack of annular friction springs is received and guided for axial movement.

4. The overload clutch of claim 1, wherein said several depressions (18) in said entraining cam disk (5) correspond in number to said plurality of axial bores (14).

5. The overload clutch of claim 1, wherein said limit elements (15, 16) comprise a stop element (15) in said housing (4), said stop element (15) reaching radially inwardly in said housing, said limit elements further comprising a circumferential recess (16) in said disk (6), said stop element (15) reaching radially into said circumferential recess (16), said circumferential recess (16) having end walls defining an angular sector within which relative movement between said housing (4) and said disk (6) is permitted, said end walls engaging said stop element (15) to define limit stops.

* * * * *